Figure 1:
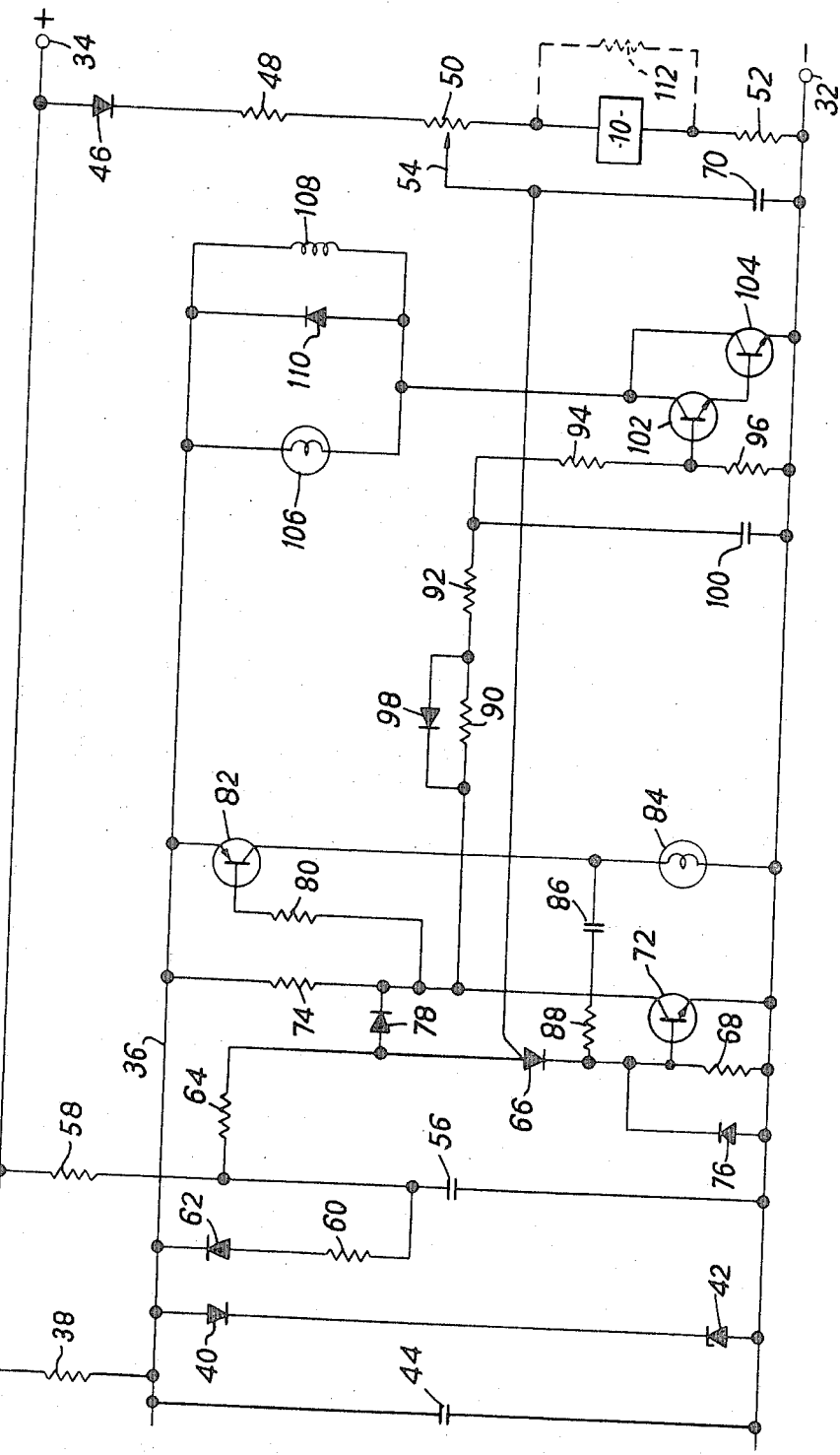

United States Patent [19]
Molyneux

[11] 3,786,342
[45] Jan. 15, 1974

[54] BATTERY DISCHARGE INDICATORS

[76] Inventor: Lindsay Molyneux, 4, Leazes Crescent, Newcastle-upon-Tyne, England

[22] Filed: June 7, 1972

[21] Appl. No.: 260,402

[30] Foreign Application Priority Data
June 11, 1971 Great Britain.................... 27531/71

[52] U.S. Cl................................ 324/29.5, 340/249
[51] Int. Cl.......................... H02j 7/16, G01n 27/46
[58] Field of Search.................. 324/29.5, 127, 129, 324/46, 117 H, 117 R; 340/249; 323/94 H; 338/32 R, 32 H; 320/48

[56] References Cited
UNITED STATES PATENTS
| | | | |
|---|---|---|---|
| 3,447,060 | 5/1969 | Tedd............................... | 340/249 X |
| 3,349,386 | 10/1967 | Zug..................................... | 340/249 |
| 3,199,026 | 8/1965 | Leibowitz.......................... | 324/127 |
| 2,946,955 | 7/1960 | Kuhrt.......................... | 324/117 H X |

FOREIGN PATENTS OR APPLICATIONS
| | | | |
|---|---|---|---|
| 1,089,864 | 7/1959 | Germany.............................. | 324/46 |

OTHER PUBLICATIONS
Gitlin, R., "Pass-Through Current Detector," Instrument and Control Systems, Vol. 44, No. 4, April 71, pg. 16.

Primary Examiner—Rudolph V. Rolinec
Assistant Examiner—Rolf Hille
Attorney—Alfred H. Rosen et al.

[57] ABSTRACT

A current-compensated battery discharge indicator comprises voltage sensing means operable to provide an indication when the battery voltage falls below a predetermined value, and current sensing means adapted to sense a magnetic field generated by load current drawn from the battery and operable upon increase of the load current to lower the predetermined value of the voltage at which the voltage sensing means is operable to provide the said indication. The current sensing means may comprise a ring core of magnetic material through which passes a cable carrying the load current, and a magneto-sensitive resistor disposed in an air-gap in the ring core.

11 Claims, 4 Drawing Figures

PATENTED JAN 15 1974 3,786,342

SHEET 2 OF 3

BATTERY DISCHARGE INDICATORS

This invention relates to battery discharge indicators.

There have been many attempts to devise a reliable state of charge indicator for use with batteries supplying the electric traction motors of industrial trucks, to provide an indication when the battery is approaching its discharged state and needs to be recharged. The most useful of these indicators are those which measure the voltage of the battery and are responsive to the current drawn from the battery so as to take into account the fall of battery voltage due to increased battery current. For example, a nominal 36 volt battery is considered to be near its discharged state if its voltage falls to 30 volts while no current is taken from it, or to 24 volts while a current of 100 amps is drawn from the battery.

A battery discharge indicator for a battery electric vehicle has been proposed in which the current drawn from the battery is measured by means of a low value resistor inserted in the main current supply from the motor, the voltage developed across the resistor being used as a measure of the battery current. This has the disadvantages that considerable heat would be generated in even a small resistor and that there would therefore be a waste of power. If, for example, the resistor developed a voltage of 0.5 volts when full load current was drawn from a 36 volt battery, this would represent a waste of power of 1.4 percent, a waste which is too big to tolerate in industrial trucks where the maximum use of stored energy is required.

According to this invention there is provided a battery discharge indicator comprising voltage sensing means adapted to be connected to a battery and operable to provide an indication when the battery voltage falls below a predetermined value, and current sensing means adapted to sense a magnetic field generated by load current drawn from the battery and operable upon increase of the load current drawn from the battery to lower the predetermined value of the voltage at which the voltage sensing means is operable to provide the said indication.

Preferably, the current sensing means comprises a core of magnetic material shaped to surround at least partially, in use, a load current carrying cable connected to the battery, so as to form a closed magnetic circuit enclosing the cable, and a magneto-sensitive device connected to the core so as to be disposed within the closed magnetic circuit.

Advantageously, the magneto-sensitive device is a magneto-sensitive resistor whose resistance varies with the magnetic field applied to the resistor.

Figure 2:
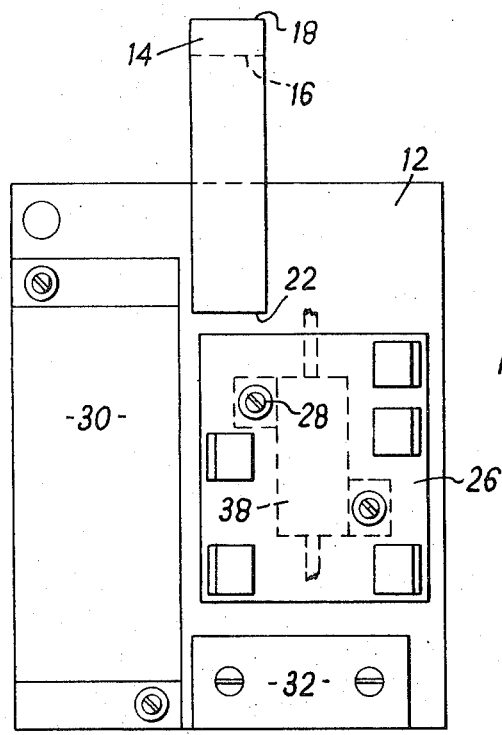
Figure 3:
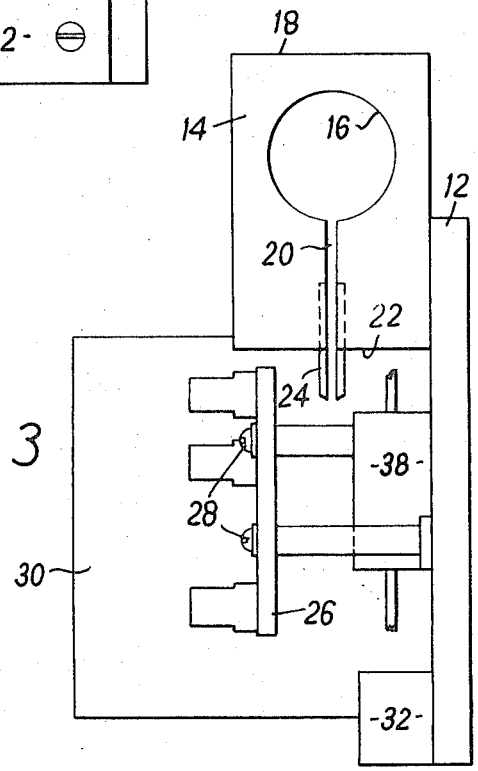
Figure 4:
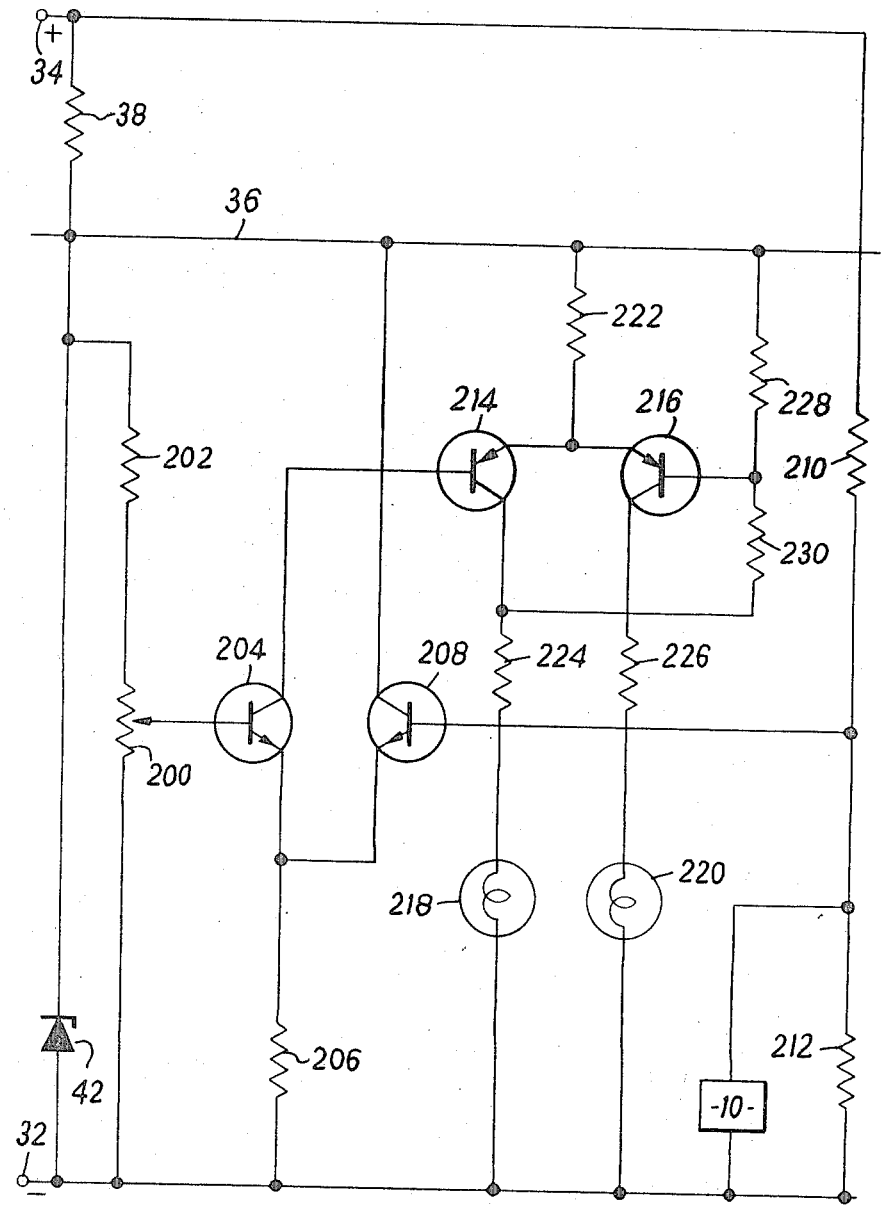

The invention will now be described, by way of example, with reference to the accompanying drawings, in which:

FIG. 1 is a circuit diagram of a battery discharge indicator constructed in accordance with the invention, FIG. 2 is a front elevation of an assembly of the principal components of the circuit of FIG. 1, FIG. 3 is a side elevation of the assembly of FIG. 2, and FIG. 4 shows an alternative circuit for the battery discharge indicator.

As shown in FIG. 1, the electrical circuit of a battery discharge indicator constructed in accordance with the invention comprises a voltage-responsive circuit to which is applied a voltage derived from a voltage divider including a magneto-sensitive resistor 10 which, as described below, is in use disposed within a magnetic field generated by load current drawn from the battery. The voltage-responsive circuit is connected between the negative terminal 32 of the electrical circuit and a constant voltage rail 36. The constant voltage rail 36 is connected through a resistor 38 to the positive terminal 34 of the electrical circuit and to the negative negative terminal 32 through a diode 40 and zener diode 42 which in use determines the stabilised voltage of the rail 36. A smoothing capacitor 44 is connected across the diode 40 and zener diode 42.

Connected in series between the positive and negative terminals 34 and 32 of the electrical circuit are a diode 46, a fixed resistor 48, a variable resistor 50, the magneto-sensitive resistor 10 and a further fixed resistor 52, in that order. The wiper arm 54 of the variable resistor 50 provides an input to the voltage-responsive circuit, which will now be described.

The voltage responsive circuit comprises a capacitor 56, one plate of which is connected to the negative terminal 32 and the other plate of which is connected through a resistor 38 to the positive terminal 34 and through a resistor 60 and a diode 62 to the positive rail 36 of the stabilised voltage supply, the diode 62 preventing the capacitor 56 from being charged from the battery to a voltage higher than a preset level. The latter plate of the capacitor 56 is also connected through a resistor 64 to the anode of a programmed unijunction transistor 66, the cathode of which is connected through a further resistor 68 to the negative terminal 52 and the gate electrode of which is connected to the wiper arm 54 of the variable resistor 50 associated with the magneto-sensitive resistor 10. If in operation, the potential of the gate electrode is low enough to render the programmed unijunction transistor 66 conducting when the capacitor 56 is charged to a sufficient voltage, then the transistor 66, and the capacitor 56 and associated resistor 58 will act as a relaxation oscillator, providing a series of positive voltage pulses at the cathode of the transistor 66. The junction of the gate electrode of transistor 66 and wiper arm 54 is connected though a smoothing capacitor 70 to the negative terminal 32.

The cathode of the programmed unijunction transistor 66 is connected to the base of an n-p-n transistor 72, the emitter of which is connected to the negative terminal 32 and the collector of which is connected through a resistor 74 to the positive rail 36 of the stabilised supply. A diode 76 is connected between the negative terminal 32 and the base of the n-p-n transistor 72 to protect the emitter-base circuit of transistor 72 from reverse bias. A diode 78 is connected between the anode of the programmed unijunction transistor 66 and the collector of the p-n-n transistor 72. The collector of the n-p-n transistor 72 is also connected through a resistor 80 to the base of a p-n-p transistor 82, the emitter of which is connected to the positive rail 36 of the stabilised supply and the collector of which is connected through the bulb of an indicating lamp 84 to the negative terminal 32. The collector of the p-n-p transistor 82 is also connected to the base of the n-p-n transistor 72 through a capacitor 86 and resistor 88 in series.

The collector of n-p-n transistor 72 is also connected through resistors 90, 92, 94 and 96 in series to the negative terminal 32. A diode 98 is connected in parallel with resistor 90, with its cathode connected to the collector of transistor 72. A capacitor 100 is connected between the junction of resistors 92 and 94 and the negative terminal 32. The junction of resistors 94 and 96 is connected to the base of an n-p-n transistor 102 which is connected in cascade with a further n-p-n transistor 104, the emitter of transistor 102 being connected to the base of transistor 104, whose emitter is connected to the negative terminal 32, and the collectors of the two transistors being connected together and to the stabilised voltage rail 36 through the bulb of a lamp 106. Connected in parallel with lamp 106 is a relay coil 108, across which is a diode 110 with its cathode connected to the rail 36.

Referring to FIGS. 2 and 3, a circuit assembly containing the principal components of the circuit of FIG. 1 comprises a mounting plate 12, which can be bolted, for example, to the body of a battery driven vehicle to which the battery discharge indicator is fitted. Bolted to the mounting plate 12 is a ring core 14 consisting of a rectangular block of wrought iron of dimensions approximately 2.0 inches by 1.4 inches and thickness 0.5 inches, formed with a circular aperture 16 of the radius 0.7 inches having its centre disposed midway between the longer and shorter sides of the rectangle and 0.7 inches from one of the shorter sides 18 of the rectangle. The block is formed with an air gap 20 of thickness 0.025 inches extending parallel to the longer sides of the rectangle from the other shorter sides 22 of the block to the aperture 20. The magneto-sensitive resistor 10 is mounted in the centre of the air gap 20, the resistor being held in place by means of an epoxy resin, and two leads 24 from the resistor extend from the air gap.

Also fixed to the mounting plate 12 and spaced from it by means of bolts 28 and surrounding spacers is a printed circuit board 26 carrying certain components of the circuit including the capacitors. Between the printed circuit board 26 and the mounting plate 12 the resistor 38, through which current is supplied to the voltage-responsive circuit and associated lamps, together with a heat sink is bolted to the mounting plate. The remaining components of the circuit, except for the lamps 84 and 106 and relay coil 108, are contained in a logic unit 30 bolted to the mounting plate 12, and the leads from the circuitry are connected to a terminal block 32 bolted to plate 12.

In use of the battery discharge indicator in a battery driven industrial truck, the mounting plate 12 of the circuit assembly is bolted to a suitable part of the vehicle, and the main current lead from the battery is threaded through the aperture 16 in the ring core 14. The two lamps 84 and 86 are mounted in suitable positions on the truck driver's control panel. The positive and negative terminals 34 and 32 are connected to the positive and negative terminals respectively of the battery.

In operation, load current drawn from the battery through the lead generates a magnetic field in the ring core 14 and in the air gap 20, so that a magnetic field proportional to the magnitude of the current is applied to the magneto-sensitive resistor 10, whose resistance is thereby varied in dependence on the current drawn from the battery.

In operation of the circuit shown in FIG. 1, the voltage divider formed by resistors 48, 50 and 52 and the magneto-sensitive resistor 10 supplies a proportion of the battery voltage, smoothed by capacitor 70, to the gate electrode of the programmed unijunction transistor 66, the magnitude of this voltage determining whether or not the transistor 66 is rendered conducting when its anode potential falls to a predetermined value. Assuming that the potential of the gate electrode of the programmed unijunction transistor is sufficiently low, the transistor is rendered conducting when the capacitor 56 has charged to a sufficient voltage from the battery through resistor 58. Resistor 60 and diode 62 limit the voltage to which capacitor 56 can be charged. When transistor 66 is rendered conducting, a positive pulse is supplied to the base of n-p-n transistor 72, turning this transistor on. The base of p-n-p transistor 82 is therefore connected to the negative side of the battery through resistor 80 and transistor 72, so that transistor 82 is rendered conducting and current flows to the lamp 84. A positive feedback potential supplied from the collector of transistor 82 to the base of transistor 72 through capacitor 86 and resistor 88 holds transistor 72 conducting until the charging current of the capacitor falls to too low a level to keep the transistor conducting, whereupon both transistors 72 and 82 are switched off. The capacitor 86 then discharges through lamp 84 and diode 76, the diode 76 protecting the emitter-base circuit of transistor 72 from reverse bias.

When the transistor 72 is rendered conducting, capacitor 56 discharges through diode 78 and transistor 72, so that the programmed unijunction transistor 66 is rendered non-conducting, and is held non-conducting whilst transistor 72 remains in a conducting condition. When transistor 72 is switched off, capacitor 56 recharges through resistor 58 and when it was charged to a sufficient voltage the programmed unijunction transistor 66 is rendered conducting and the cycle is repeated. Thus, so long as the potential applied to the gate electrode of the programmed unijunction transistor 66 is sufficiently low, the transistor 82 will be rendered alternately conducting and non-conducting, with the result that the lamp 84 will flash on and off.

While transistor 72 is non-conducting, capacitor 100 charges through resistors 74, 90 and 92, and the capacitor discharges through resistor 92, diode 98, resistor 74 and transistor 72 when the transistor 72 is conducting, the presence of diode 98 ensuring that the time constant of discharge is lower than that of charging of the capacitor. The values of the components are such that when the lamp 84 is flashing, capacitor 100 is not charged to a voltage sufficient to render the transistor pair 102, 104 conducting, so that the lamp 106 remains unlit.

When the potential of the gate electrode of programmed unijunction transistor 66 is sufficiently high to keep the transistor in a non-conducting state, transistors 72 and 82 remain non-conducting and lamp 84 remains unlit. At the same time, capacitor 100 is charged through resistors 74, 90 and 92, and transistor 102 is switched on. Transistor 104 is thereby rendered conducting and current flows through lamp 106 and the relay coil 108. Diode 110 acts to dissipate the energy stored in relay coil 108 when transistor 104 is switched off.

Thus, when the voltage of the battery is high, the lamp 106 will remain continuously alight, as an indication that the battery is sufficiently charged, and lamp 84 will remain unlit. If the open circuit voltage of the battery falls, the potential of the gate electrode of the programmed unijunction transistor falls proportionately, and when it has fallen to a predetermined value the lamp 84 will begin to flash and lamp 106 will be turned off. The adjustment of potentiometer 50 is set so that lamp 84 begins to flash when the open circuit voltage of the battery as fallen to a predetermined voltage corresponding to the near discharged state of the battery, so that the flashing lamp gives an indication to the truck driver that the battery needs recharging. If, when the open circuit battery voltage is above the predetermined voltage, current is drawn from the battery, the battery voltage will fall. However, the battery current will cause the resistance of the magneto-sensitive resistor 10 to increase, so that the proportion of battery voltage applied to the voltage-responsive circuit will increase. This will compensate for the fall in battery voltage so that the lamp 106 will remain alight so long as the open circuit voltage of the battery, irrespective of the current drawn from the battery. The values of resistors 48 and 52 and potentiometer 50 are selected so that the response characteristic of the circuits matches the voltage-current characteristics of the battery. If necessary, a further resistor 112 is connected across the magneto-sensitive resistor 10, to modify the response characteristic of the circuit.

Diodes 40 and 46 are provided to compensate for the effects of temperature changes on the zener diode 42 and magneto-sensitive resistor 10.

The relay coil 108 may be arranged to operate a switch in the control circuit of one of the auxiliary mechanisms of the vehicle, for example the fork raising mechanism of a fork lift truck, so that when the relay coil 108 is de-energised the auxiliary mechanism cannot be operated until the battery has been recharged.

The alternative electrical circuit of the battery discharge indicator shown in FIG. 4 similarly comprises a voltage-responsive circuit to which is applied a voltage derived from a voltage divider including the magneto-sensitive resistor 10 as described below. The voltage-responsive circuit as in the circuit of FIG. 1, is supplied with a stabilised constant voltage derived from a zener diode 42 connected, in series with a resistor 38 to the negative and positive terminals 32 and 34 of the circuit. A potentiometer 200 is connected in series with a fixed resistor 202 across the stabilised voltage supply, and the movable contact of the potentiometer is connected to the base of an n-p-n transistor 204, the emitter of which is connected through a resistor 206 to the negative terminal 32. The emitter of the transistor 204 is also connected to the emitter of a second n-p-n transistor 208 whose collector is connected to the positive rail 36 of the stabilised voltage supply and whose base is connected to the positive terminal 34 through a fixed resistor 210 and to the negative terminal 32 through a further fixed resistor 212 in parallel with the magneto-sensitive resistor 10. The two fixed resistors 120 and 212 and the magneto-sensitive resistor 10 thus form a voltage divider supplying to the base of the second transistor 208 potential which in use, is a fraction of the battery voltage, the fraction depending on the relative values of the resistors. If the potential of the base of the second transistor 208 is greater than the potential of the base of the first transistor 204, set by the potentiometer 200, then the second transistor 208 is in a conducting condition and the first transistor 204 is held in a non-conducting condition. If the potential of the base of the second transistor 208 falls below that of becomes non-conducting and the first transistor 204 is rendered conducting.

The collector of the first transistor 204 is connected to the base of one of a pair of p-n-p transistors 214 and 216 controlling the energisation of a pair of indicating lamps 218 and 220 positioned on the control panel of the truck. The emitters of the p-n-p transistors 214 and 216 are connected together and the junction of the emitters is connected through a resistor 222 to the positive rail 36 of the stabilised voltage supply. The collector of the first p-n-p transistor 214 is connected through a resistor 224 and a red light bulb 218 in series to the negative terminal 32, whilst the collector of the second p-n-p transistor 216 is connected through a resistor 226 and a green light bulb 220 to the negative terminal 32. The base of the second p-n-p transistor 216 is connected to the junction of a pair of equal high resistors 228 and 230 connected in series between the positive rail 36 of the stabilised voltage supply and the collector of the first p-n-p transistor 214. The values of the resistors 228 and 230 are such that when the first p-n-p transistor 214 is non-conducting the second p-n-p transistor is conducting 216, so that the green lamp 220 is alight, the current then flowing through the two high resistors 228 and 230 and the red lamp 218 being too low to cause the lamp 218 to light. When the first p-n-p transistor 214 is rendered conducting the potential of the base of the second p-n-p transistor 216 rises and that transistor is rendered non-conducting, so that the green lamp 220 is extinguished whilst the red lamp 218 is lit.

In operation, when the voltage of the battery connected across terminals 32 and 34 is high, the first n-p-n transistor 204 is non-conducting, so that the first p-n-p transistor 214 is held non-conducting and the green lamp 200 is alight. If the open circuit voltage of the battery falls, the potential applied to the base of the second n-p-n transistor 208 falls proportionately. The potentiometer 200 associated with the first n-p-n transistor 204 is set so that that transistor 204 is rendered conducting when the open-circuit voltage of the battery falls below a predetermined value. When this happens, the first p-n-p transistor 214 is rendered conducting, so that the green lamp 200 goes out and the red lamp 218 is switched on, indicating to the truck operator that the battery is near its discharged state. If, when the open circuit battery voltage is above the predetermined value, current is drawn from the battery, the battery voltage will fall. However, the battery current will cause the resistance of the magneto-sensitive resistor to increase, as described above, so that the proportion of the battery voltage applied to the base of the second n-p-n transistor will increase. As before, this will compensate for the fall in battery voltage so taht the green lamp 220 will remain alight so long as the open circuit voltage of the battery remains high, irrespective of the current drawn from the battery.

A thermistor may be positioned close to the magneto-sensitive resistor 10 and connected in series with the magneto-sensitive resistor to compensate for change in the resistance of the magneto-sensitive resistor with temperature.

It will be appreciated that any modifications could be made in each of the described embodiment. For example, different forms and dimensions of the ring core could be used, though it is preferable that the mean circumference of the core should be not greater than four inches, to ensure that the magnetic reluctane of the iron is small compared with that of the air gap and that the magnetic field in the air gap is thereby relatively high.

It will be apparent that other devices sensitive to magnetic field could be used in place of the magneto-sensitive resistor. For example, a Hall effect device could be used, suitable circuitry being provided to modify the trigger point of the voltage sensing circuit in dependence upon the output voltage developed by the Hall effect device.

The described battery discharge indicator, being robust in construction, is particularly suitable for use with battery driven electric vehicles, though it can of course be used in other applications.

I claim:

1. A battery discharge indicator comprising voltage sensing means adapted to be connected to a battery and operable to provide an indication when the battery voltage falls below a predetermined value, and current sensing means adapted to sense a magnetic field generated by load current drawn from the battery and operable upon increase of the load current drawn from the battery to lower the predetermined value of the voltage at which the voltage sensing means is operable to provide the said indication, said current sensing means being operable at substantially all levels of load current that may be drawn from the battery.

2. A battery discharge indicator as claimed in claim 1, in which the current sensing means comprises a core of magnetic material positioned, in use, relative to a load current carrying cable connected to the battery so that, in operation, a magnetic field is generated in the core by load current flowing in the cable, and a magneto-sensitive device positioned so as to lie, in operation, in the magnetic field.

3. A battery discharge indicator as claimed in claim 2, in which the core of magnetic material is shaped to surround at least partially, in use, the load current carrying cable connected to the battery, so as to orm a closed magnetic circuit enclosing the cable, and the magneto-sensitive device is connected to the core so as to be disposed within the closed magnetic circuit.

4. A battery discharge indicator as claimed in claim 3, in which the core is formed from a ring of magnetic material having a central aperture of a size sufficient to receive a load current carrying cable threaded, in use, through the ring, the ring being formed with a radially extending air gap in which the magneto-sensitive device is disposed.

5. A battery discharge indicator as claimed in claim 2 in which the magneto sensitive device is a magneto-sensitive resistor whose resistance varies with the magnetic field applied to the resistor.

6. A battery discharge indicator as claimed in claim 5, in which the voltage sensing means comprises a chain of resistors including the magneto-sensitive resistor forming a voltage divider adapted to be connected across the battery and arranged to provide an output voltage dependent on the voltage of the battery and the resistance of the magneto-sensitive resistor, and a voltage-responsive circuit arranged to receive the output voltage from the voltage divider and operable to provide the said indication when the output voltage falls below a preset value.

7. A battery discharge indicator as claimed in claim 6, in which the chain of resistors includes a variable resistor for adjusting the predetermined value of the battery voltage, for a given load current, at which the output voltage of the voltage divider is equal to the preset voltage.

8. A battery discharge indicator as claimed in claim 6, in which the voltage-responsive circuit comprises a relaxation oscillator including a programmed unijunction transistor the gate electrode of which is connected to the voltage divider so that, in use, a fall in the output voltage of the voltage divider below the preset value causes the programmed unijunction transistor to be rendered alternating conducting and non-conducting, and an indicating circuit including an indicating lamp adapted to be alterately energised and de-energised in response to the alternate conduction and non-conduction of the programmed unijunction transistor.

9. A battery discharge indicator as claimed in claim 8, in which there is provided a further indicating circuit including a further lamp and connected to the programmed unijunction transistor so that the further lamp is, in use, continuously energised when the programmed unijunction transistor is held non-conducted by the output voltage remaining in excess of the pre-set voltage.

10. A battery discharge indicator as claimed in claim 6, in which the voltage-responsive circuit comprises a bistable circuit adapted to be put in a first condition when the output voltage of the voltage divider exceeds the pre-set voltage and to be put in a second condition when the output voltage falls below the pre-set voltage, and indicating means operable to provide an indication when the bistable circuit is in its second condition.

11. A battery discharge indicator comprising voltage sensing means adapted to be connected to a battery and to sense the voltage thereof at all levels of load current, current sensing means adapted to sense a magnetic field generated by load current drawn from the battery, and circuit means adapted to provide an indication when the voltage sensed by the voltage sensing means falls below a value which is varied in dependence on the magnitude of the load current sensed by the current sensing means, said circuit means being so arranged that an increase in the load current causing a decrease in the said value.

* * * * *